No. 772,181. Patented October 11, 1904.

UNITED STATES PATENT OFFICE.

JOSEPH D. SCOTT, OF SHIELDS, ENGLAND.

HEAT-INSULATING COMPOUND.

SPECIFICATION forming part of Letters Patent No. 772,181, dated October 11, 1904.

Application filed February 2, 1904. Serial No. 191,896. (No specimens.)

*To all whom it may concern:*

Be it known that I, JOSEPH D. SCOTT, a subject of the King of Great Britain, and a resident of Shields, England, have invented a new and Improved Heat-Insulating Compound, of which the following is a full, clear, and exact description.

This invention relates to a heat-insulating compound useful in various connections, but especially intended as a covering for boilers, steam-pipes, and equivalent structures to prevent the loss of heat by radiation.

The insulating compound is composed of asbestos and mica with a starch-like bonding, enabling the compound to be prepared in plastic form and spread over the surface to which it is to be applied, after which the compound will set permanently to said surface.

I will now give a specific example of one manner of compounding and applying the invention, and subsequently in the claims I will set forth the actual scope of my invention.

The following ingredients should be thoroughly mixed in the proportions given: powdered asbestos, seventy pounds; powdered mica, twenty pounds; flour, ten pounds; cement, ten pounds. To these ingredients mixed as described a quantity of water or other liquid should be added sufficient to form a paste or plaster-like substance, which may be applied to the surface to be protected and allowed to harden to form a permanent covering.

In the practical employment of the invention it will be found convenient not to mix the ingredients with water until the time when the compound is to be actually employed. Assuming that it is to be applied to a boiler, the surface of the boiler should be perfectly cleaned from dirt, grease, rust, or the like, and the insulating compound, with the proper quantity of water mixed therewith to form a plaster-like substance, should be applied, preferably with the hand and trowel. First a thin coat should be applied and allowed perfectly to dry, after which a number of additional coats should be applied until the entire mass lies over the boiler with sufficient thickness. Each coat should be relatively thin. For instance, three-eighths to one-half an inch is regarded as quite sufficient, and each coat should be allowed to become perfectly dry and set before putting on another coat. The last coat may be leveled off in any desired manner. After the compound has been applied and allowed to dry and set it is preferable to paint, varnish, or otherwise cover the surface of the compound to protect it against moisture.

The compound is sufficiently adhesive to hold securely to the surface to which it is applied without the need of laggings and external fastenings, as usually employed.

Various forms of starch-like or starch-containing substances may be employed instead of flour; but I have found commercial wheat-flour best adapted for the purpose. The flour serves as a bonding to cause the various ingredients to assume a paste-like form. By extensive experiments I have found that flour or other starch-like substances are the only materials which can be used to cause the asbestos and mica to combine for heat-resisting purposes. The cement is preferably of the class known as "Portland" cement and is used to cause the compound to set and harden, giving it its permanent form.

Having thus described my invention, I claim as new and desire to secure by Letters Patent—

1. A heat-insulating compound, comprising powdered asbestos, powdered mica, a bonding substance, and cement, in about the proportions specified.

2. A heat-insulating compound comprising powdered asbestos, powdered mica, a starch-like substance, and cement, substantially as described.

In testimony whereof I have signed my name to this specification in the presence of two subscribing witnesses.

JOSEPH D. SCOTT.

Witnesses:
 ISAAC B. OWENS,
 JNO. M. RITTER.